United States Patent
Brookes et al.

(10) Patent No.: US 8,517,396 B2
(45) Date of Patent: Aug. 27, 2013

(54) HEIGHT CONTROL MODULE, GAS SPRING ASSEMBLY AND METHOD

(75) Inventors: Graham R. Brookes, Carmel, IN (US); Larry L. Lockridge, Fishers, IN (US); Anthony E. Gambrall, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 45 days.

(21) Appl. No.: 13/375,656

(22) PCT Filed: Jun. 1, 2010

(86) PCT No.: PCT/US2010/036906
§ 371 (c)(1),
(2), (4) Date: Dec. 1, 2011

(87) PCT Pub. No.: WO2010/141472
PCT Pub. Date: Dec. 9, 2010

(65) Prior Publication Data
US 2012/0086178 A1    Apr. 12, 2012

Related U.S. Application Data

(60) Provisional application No. 61/182,859, filed on Jun. 1, 2009.

(51) Int. Cl.
*B60G 17/018*    (2006.01)
(52) U.S. Cl.
USPC .................. 280/6.158; 280/5.514; 280/6.157; 267/64.19; 267/64.27; 307/10.1

(58) Field of Classification Search
USPC .................. 280/5.151, 5.157–6.159, 124.16, 280/124.157; 267/64.16, 64.19, 64.21, 64.23, 267/64.24; 307/10.1
See application file for complete search history.

(56) References Cited

U.S. PATENT DOCUMENTS

| | | | |
|---|---|---|---|
| 4,168,840 A * | 9/1979 | Graham | 280/6.157 |
| 4,310,172 A | 1/1982 | Claude et al. | |
| 4,386,791 A | 6/1983 | Watanabe | |
| 4,391,452 A * | 7/1983 | Ohmori | 280/6.158 |
| 4,540,188 A * | 9/1985 | Meloche et al. | 280/6.158 |
| 4,634,142 A | 1/1987 | Woods et al. | |
| 4,783,089 A | 11/1988 | Hamilton | |
| 4,798,369 A | 1/1989 | Geno et al. | |
| 5,141,246 A | 8/1992 | Nakaniwa | |
| 5,167,289 A | 12/1992 | Stevenson | |
| 5,220,505 A | 6/1993 | Yokote et al. | |
| 5,301,111 A | 4/1994 | Utsui et al. | |

(Continued)

FOREIGN PATENT DOCUMENTS

| | | |
|---|---|---|
| EP | 0 678 727 A2 | 10/1995 |
| EP | 0 828 087 A1 | 3/1998 |

(Continued)

*Primary Examiner* — Ruth Ilan
(74) *Attorney, Agent, or Firm* — Jason A. Houser; Fay Sharpe LLP

(57) ABSTRACT

A gas spring assembly includes a gas spring and a height control module. The gas spring includes a first end member, a second end member and a flexible wall secured therebetween. The height control module includes a height control system that is operatively associated with the gas spring. The height control system includes a sensor, a valve arrangement and a fixed-logic control circuit. A suspension system and a method are also included.

22 Claims, 6 Drawing Sheets

(56) References Cited

U.S. PATENT DOCUMENTS

| | | |
|---|---|---|
| 5,337,137 A | 8/1994 | Ogawa et al. |
| 5,350,983 A | 9/1994 | Miller et al. |
| 5,521,497 A | 5/1996 | Schneider et al. |
| 5,653,315 A | 8/1997 | Ekquist et al. |
| 5,707,045 A | 1/1998 | Easter |
| 5,740,039 A | 4/1998 | Hirahara et al. |
| 5,859,692 A | 1/1999 | Ross, Jr. et al. |
| 5,936,161 A | 8/1999 | Fischer |
| 6,032,535 A | 3/2000 | Fischer et al. |
| 6,036,179 A | 3/2000 | Rensel |
| 6,637,269 B2 | 10/2003 | Reck et al. |
| 6,698,730 B2 | 3/2004 | Easter |
| 7,104,547 B2 | 9/2006 | Brookes et al. |
| 7,267,331 B2 | 9/2007 | Holbrook et al. |
| 7,621,538 B2 | 11/2009 | Nordmeyer et al. |
| 2002/0035423 A1 | 3/2002 | Shank et al. |
| 2003/0001346 A1 | 1/2003 | Hamilton et al. |
| 2004/0245687 A1 | 12/2004 | Sendrea et al. |
| 2005/0077691 A1 | 4/2005 | Witters |
| 2005/0093265 A1 | 5/2005 | Niaura et al. |
| 2005/0161891 A1 | 7/2005 | Trudeau et al. |
| 2006/0100757 A1* | 5/2006 | Feilen et al. .................... 701/36 |
| 2006/0267297 A1 | 11/2006 | Nordmeyer et al. |
| 2007/0120334 A1* | 5/2007 | Holbrook .................. 280/6.157 |
| 2007/0257833 A1* | 11/2007 | Nordmeyer .................. 342/118 |
| 2008/0048405 A1 | 2/2008 | DeLorenzis et al. |
| 2008/0054537 A1 | 3/2008 | Harrison |
| 2009/0020928 A1* | 1/2009 | Nordmeyer ................ 267/64.19 |

FOREIGN PATENT DOCUMENTS

| | | |
|---|---|---|
| EP | 0 924 115 A | 6/1999 |
| EP | 0 828 087 B1 | 12/1999 |
| WO | WO 89/12766 | 12/1989 |
| WO | WO 2005/032863 | 4/2005 |
| WO | WO 2010/141472 A1 | 12/2010 |

\* cited by examiner

HEIGHT CONTROL MODULE, GAS SPRING ASSEMBLY AND METHOD

BACKGROUND

The subject matter of the present disclosure broadly relates to the art of gas spring assemblies and, more particularly, to a gas spring assembly that includes a fixed-logic control circuit adapted to utilize a sensor signal from a height sensor to selectively operate a valve arrangement to increase and/or decrease the height of the gas spring assembly. A height control module that includes the fixed-logic circuit as well as a suspension system and method are also described.

It will be appreciated that the subject gas spring assembly, height control module, suspension system and method are amenable to broad use in a wide variety of applications and environments. One example of a suitable application includes use of the foregoing in connection with an associated vehicle, and the subject matter of the present disclosure will be discussed in detail hereinafter with specific reference to use in operative association with an associated vehicle. However, it is to be specifically understood that the subject gas spring assembly, height control module, suspension system and method are capable of broad application and are not intended to be limited to this specific example of a suitable application.

Gas spring assemblies of a variety of type and kinds are known to be used in suspension systems between opposing structural components of a vehicle. Additionally, a variety of devices and/or arrangements have been and are currently used to effect control of the relative position of one structural component of the vehicle to another structural component. As one example, a mechanical linkage valve that is in fluid communication between a compressed gas source and a gas spring assembly can be interconnected between the opposing structural components. As the structural components move toward and away from one another, the valve opens and closes to permit pressurized gas to be transferred into and out of the gas spring assembly. In this manner, such mechanical linkage valves can permit control of the height of the gas spring assembly.

Unfortunately, such arrangements have a number of problems and/or disadvantages that are commonly associated with the continued use of the same. One problem with the use of mechanical linkage valves, particularly those used in association with the suspension system of a vehicle, is that the linkages are frequently subjected to physical impacts, such as may be caused by debris from a roadway, for example. This can result in the linkage being significantly damaged or broken, such that the valve no longer operates properly, if the valve operates at all.

Due to the potential for known mechanical linkage valves to be damaged, regular inspection and replacement of such mechanical linkage valves is typically recommended. In geographical areas where road conditions may be poor and result in the increased potential for damage, such as developing countries, for example, the capability to inspect and repair such components will often be limited or may even be unavailable. As such, a gas spring assembly that avoids the use of mechanical linkages is desirable.

Another disadvantage of known mechanical linkage valves relates to the performance and operation thereof in connection with an associated suspension system. That is, known mechanical linkage valves generally open and close under predetermined height conditions regardless of the operating condition or inputs acting on the vehicle. As such, it is possible that operating conditions of the vehicle might occur during which the performance of a height change would be undesirable. Unfortunately, conventional suspension systems that utilize mechanical linkage valves are not typically capable of selective operation.

Height control systems for vehicle suspension systems have been developed that avoid the use of mechanical linkage valves. Additionally, such systems are often capable of selective operation such that height changes can be avoided under certain conditions of operation of the vehicle. In most cases, however, it seems that such known height control systems are highly sophisticated and rely upon complex algorithms and software that operates within electronic controllers having relatively high-speed processors to perform the height control computations. In addition to the high relative cost of known height control systems, the capability to maintain and repair such systems may be limited, or even unavailable. This provides further disincentive for the adoption and use of gas spring assemblies for vehicle suspension systems.

As such, it is believed to be beneficial to develop a gas spring assembly and fixed-logic height control circuit for overcoming the foregoing and/or other deficiencies that may exist in the art.

BRIEF DESCRIPTION

One example of a gas spring assembly in accordance with the subject matter of the present disclosure includes a first end member including a wall and a passage extending therethrough. A second end member is disposed in spaced relation to the first end member. A flexible wall is secured on the first and second end members such that a spring chamber is at least partially defined therebetween. A height control system is supported on the wall of the first end member and includes a sensor operative to generate a signal having a relation to a distance between the first and second end members. The height control system also includes a valve arrangement in fluid communication with the spring chamber through the passage in the wall of the first end member. The valve arrangement is selectively operable between a first condition that permits one of gas transfer into the spring chamber and gas transfer out of the spring chamber, a second condition that permits the other of gas transfer into the spring chamber and gas transfer out of the spring chamber, and a third condition in which the spring chamber is fluidically isolated. The height control system further includes a fixed-logic control circuit that is capable of operating at a first response rate when the valve arrangement is in one of the first and second conditions and is capable of operating at a second response rate when the valve arrangement is in the third condition. The second response rate being substantially greater than the first response rate. The fixed-logic control circuit includes an input section and an output section. The input section is adapted to receive the signal from the sensor and convert the signal to a reference voltage. The output section is operative to compare the reference voltage to a first threshold voltage and a second threshold voltage. The output section is adapted to initiate switching of the valve arrangement into the first condition if the reference voltage is greater than the first threshold voltage. The output section is adapted to initiate switching of the valve arrangement to the second condition if the reference voltage is less than the second threshold voltage.

One example of a suspension system for an associated vehicle having an associated unsprung mass and an associated sprung mass includes a gas spring assembly according the preceding paragraph. The gas spring assembly being operatively connected between the associated sprung and unsprung masses of the associated vehicle. The suspension system also includes a pressurized gas source in fluid communication with the valve arrangement of the gas spring assembly. The pressurized gas source is operative to supply pressurized gas to the gas spring assembly. The suspension system further includes an electrical power source in electrical communication with at least the fixed-logic control circuit.

One example of height control module in accordance with the subject matter of the present disclosure is provided that is adapted for securement on an associated end member of an associated gas spring assembly. The height control module includes a housing adapted for securement on the associated end member of the associated gas spring assembly. The housing includes a housing wall that at least partially defines a housing chamber. A sensor is at least partially disposed within the housing chamber and is operative to generate a signal having a relation to a height of the associated gas spring assembly. A valve arrangement is at least partially disposed within the housing chamber. The valve arrangement is selectively operable between a first condition that is capable of permitting one of gas transfer into the associated gas spring assembly and gas transfer out of the associated gas spring assembly, a second condition that is capable of permitting the other of gas transfer into the associated gas spring assembly and gas transfer out of the associated gas spring assembly, and a third condition capable of fluidically isolating the associated gas spring assembly. A fixed-logic control circuit is at least partially disposed within the housing chamber. The fixed-logic control circuit is capable of reacting at a first response rate when the valve arrangement is in one of the first and second conditions and is capable of reacting at a second response rate when the valve arrangement is in the third condition. The second response rate is substantially greater than the first response rate. The fixed-logic control circuit includes an input section and an output section. The input section is adapted to receive the signal from the sensor and convert the signal to a reference voltage. The output section is operative to compare the reference voltage to a first threshold voltage and a second threshold voltage. The output section is adapted to initiate switching of the valve arrangement to the first condition if the reference voltage is greater than the first threshold voltage. The output section is adapted to initiate switching of the valve arrangement to the second condition if the reference voltage is less than the second threshold voltage.

In another arrangement, a system controls the height of a gas spring assembly mounted to a vehicle. The system includes a sensor that measures a height value of a gas spring and outputs a signal that has a relation to the height value. A valve assembly includes an inlet valve and an exhaust valve. The inlet valve permits gas transfer into the gas spring and the exhaust valve permits gas transfer out of the gas spring. A circuit includes an input section and an output section. The input section receives the signal from the sensor and converts the signal into a reference voltage. The output section compares the reference voltage to both a first threshold voltage and a second threshold voltage. The first and second threshold voltages are each determined via at least one resistive element. The output section outputs a signal to activate the exhaust valve if the reference voltage is greater than the first threshold voltage and outputs a signal to activate the inlet valve if the reference voltage is less than the second threshold voltage. The output section delays conversion of the signal into a reference voltage for comparison if either the exhaust valve or the inlet valve is active.

In yet another arrangement, a vehicle with an adjustable suspension system includes at least one gas spring assembly. The gas spring assembly includes a sensor that measures a height value of a gas spring and a valve assembly that permits gas transfer into and out of the gas spring. A fixed-logic controller receives the height value from the sensor and activates the valve assembly based at least in part on the height measured by the sensor. The fixed-logic controller is a circuit that includes at least one of a resistor, a capacitor, an amplifier, and a transistor. The sensor, the valve assembly and the fixed-logic controller are externally mounted to the gas spring. A vehicle control system can be provided on the vehicle and interface with the fixed-logic controller of at least one gas spring assembly. The vehicle control system can selectively operate a pressurized gas system that generates and/or transfers quantities of pressurized gas and/or selectively control a power source that permits the pressurized gas system to provide pressurized gas to the valve assembly.

DETAILED DESCRIPTION

As used herein, terms such as "processor" may refer to a device capable of conversion, translation, encryption, decryption, encoding, decoding and other actions or manipulations of data, commands and/or instructions. As an example, an analog-to-digital processor may be used to convert an analog signal into a digital signal. As another example, a signal processing device may be used to encode or otherwise combine and/or convert a plurality of signals, such as digital sensor signals, for example, into a form suitable for communication on a vehicle or local network.

Additionally, terms such as "controller" may refer to components for performing actions that involve evaluating or comparing data and/or instructions, and making decisions or determinations regarding the actions based upon predefined criteria, such as may be implemented in a software program or algorithm, for example. A "processor" or "processing device," as discussed above, could be used to execute, perform or cause the performance of such an action based on the predefined criteria.

Figure 1:
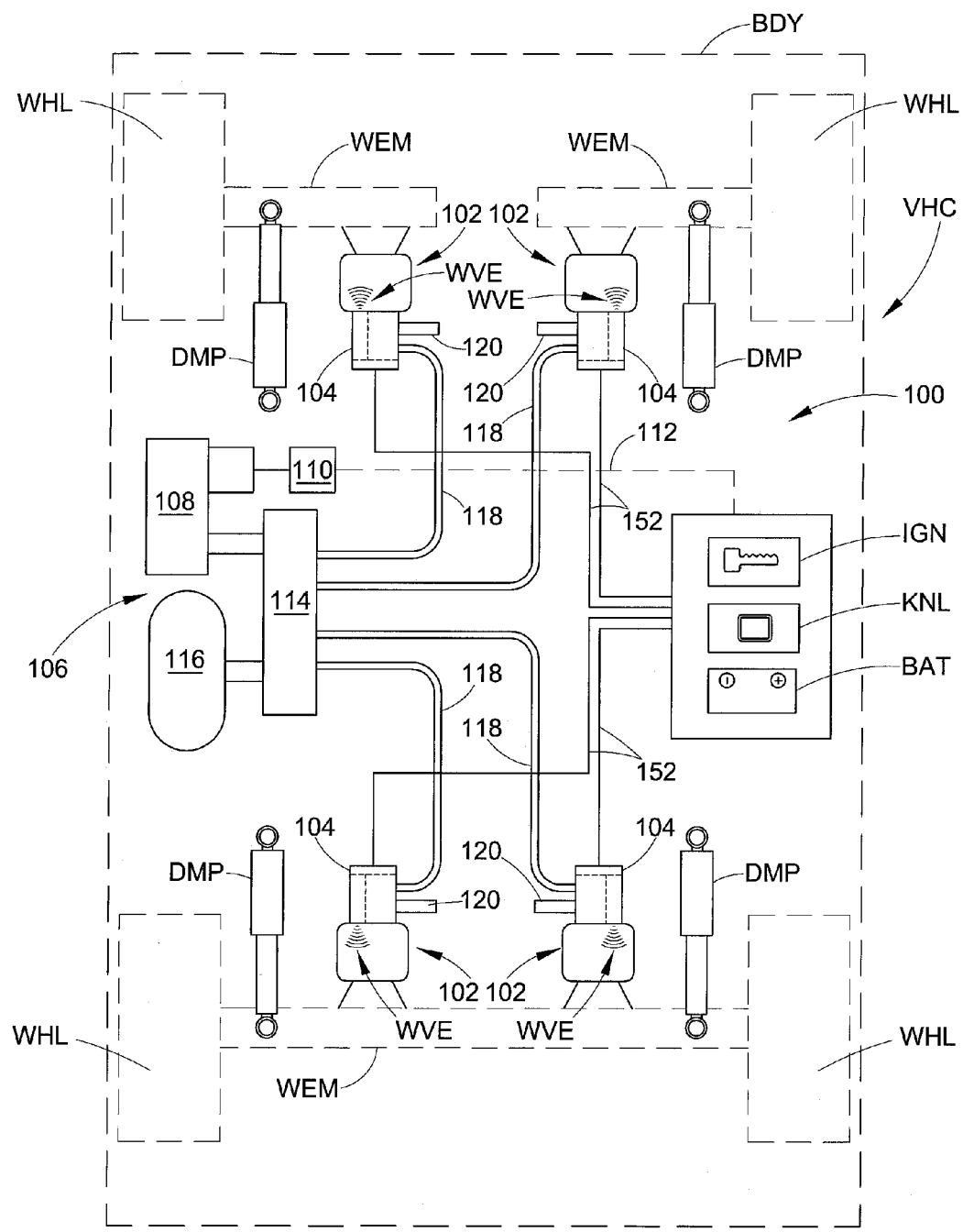
FIG. 1 is a schematic representation of one example of a suspension system for an associated vehicle that includes a gas spring assembly in accordance with the subject matter of the present disclosure.

Turning now to the drawings, wherein the showings are for the purpose of illustrating exemplary embodiments of the present novel concept and not for the purpose of limiting the same, FIG. 1 illustrates one embodiment of a suspension system 100 disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can optionally include a plurality of damping elements, such as damping members DMP, for example, that can be separately provided and operatively connected between the sprung and unsprung masses of the associated vehicle in any suitable manner.

Such a suspension system also includes a plurality of gas spring assemblies that are supported between the sprung and unsprung masses of the associated vehicle. In the embodiment shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other suitable configuration or arrangement. As is schematically represented in FIG. 1, gas spring assemblies 102 are supported between wheel-engaging members WEM and body BDY of associated vehicle VHC. As will be discussed in greater detail hereinafter, gas spring assemblies 102 include a height control module 104 that is operative to selectively increase and decrease the height of the corresponding gas spring assembly with which the height control module is associated. Additionally, it will be recognized that the gas spring assemblies shown and described herein (e.g., gas spring assemblies 102) are of a rolling lobe-type construction. However, it will be appreciated that the present novel concept can be utilized in association with any other suitable gas spring assembly arrangements and/or construction, such as convoluted-type gas spring assemblies, for example.

Suspension system 100 also includes a pressurized gas system 106 that is operatively associated with the gas spring assemblies for selectively supplying pressurized gas (e.g., air) thereto and selectively transferring pressurized gas therefrom. In the exemplary embodiment shown in FIG. 1, pressurized gas system 106 includes a pressurized gas source, such as a compressor 108, for example, for generating pressurized air or other gases. Compressor 108 can include any suitable components, devices and/or systems for effecting operation of the compressor to generate pressurized gas. As one example, compressor 108 can be in communication with a controller 110 that is operative to selectively energize or otherwise actuate the compressor. Controller 110 can be operatively connected to any number of one or more vehicle components, such as is represented in FIG. 1 by dashed line 112. For example, controller 110 can be operatively connected to an electrical power source, such as a battery BAT, for example. The controller can be connected to battery BAT directly or through a suitable electrical switching device, such as an ignition switch IGN, for example. It will be appreciated, however, that any other suitable arrangement could alternately be used.

The pressurized gas system can also include any number of one or more additional components and/or devices of any suitable type, kind and/or construction. For example, a connector body or manifold 114 can optionally be provided for effecting fluid communication between one or more components and/or devices, such as between gas spring assemblies 102 and compressor 108, for example. Optionally, pressurized gas system 106 can also include a reservoir 116 adapted store pressurized gas at an elevated pressure level. As one example, reservoir 116 can be in fluid communication with gas spring assemblies 102 and compressor 108, such as by way of connector body 114, for example.

Pressurized gas can be transmitted to and/or from gas spring assemblies 102 in any suitable manner. As one example, gas lines 118 can fluidically interconnect the gas spring assemblies with compressor 108 and/or reservoir 116, such as by way of connector body 114, for example. Additionally, pressurized gas can be vented or otherwise exhausted from gas spring assemblies 102 in any suitable manner. As one example, exhaust elements (e.g., mufflers) 120 can be provided at each of gas spring assemblies 102. It will be appreciated, however, that any other arrangement and/or configuration could alternately be used.

Figure 2:
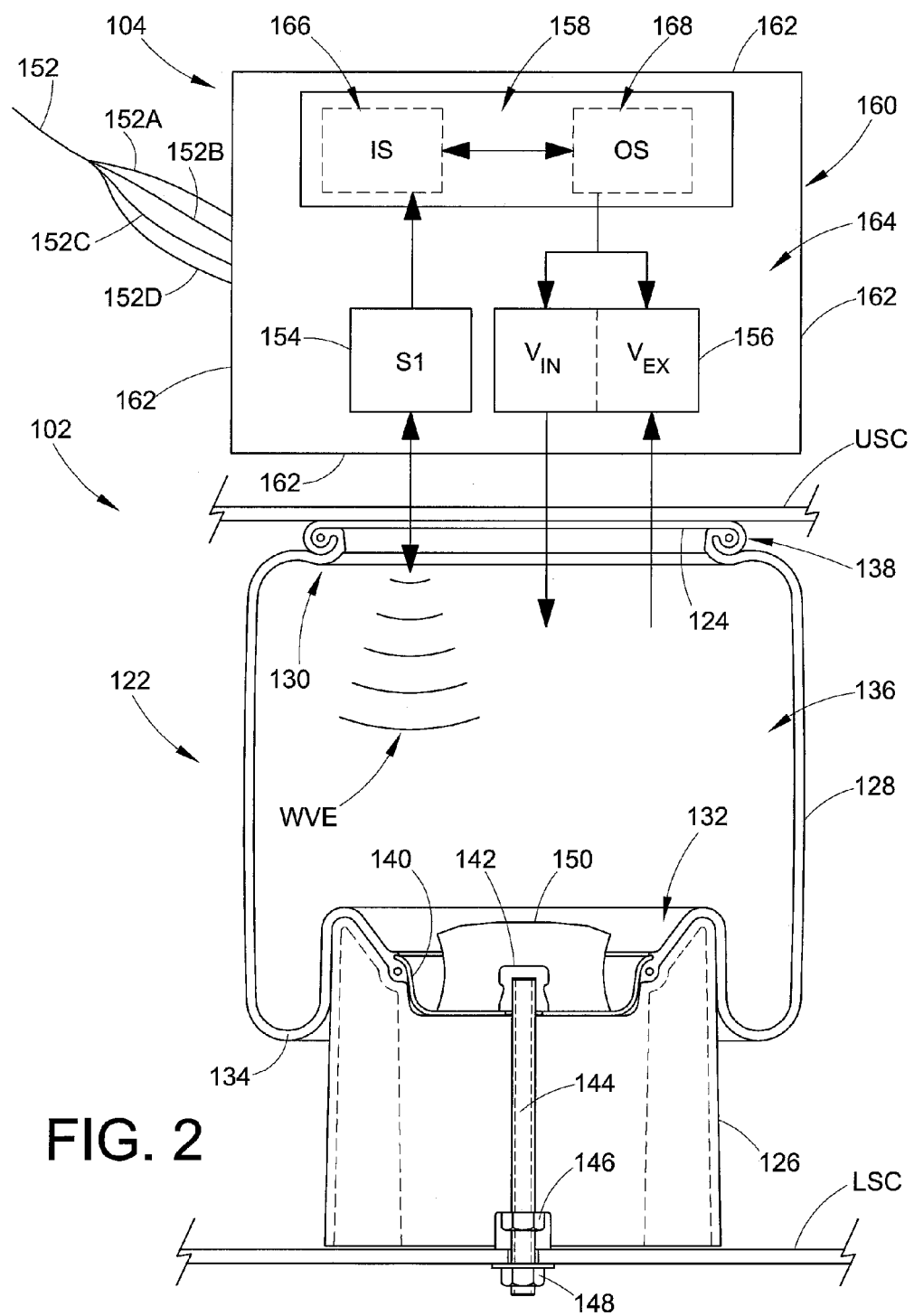
FIG. 2 is a schematic representation of one example of a gas spring assembly in accordance with the subject matter of the present disclosure.

Turning now to FIG. 2, one exemplary arrangement of gas spring assembly 102 is shown supported between an upper structural component USC and an opposing lower structural component LSC, which components are merely representative of structural components of any suitable type, kind and/or configuration, such as body BOY and wheel-engaging member WEM of vehicle VHC in FIG. 1, for example. Gas spring assembly 102 includes a gas spring 122 and height control module 104, which is operatively associated with the gas spring.

Gas spring 122 includes a first end member, such as a first bead plate 124, for example, and a second end member, such as a piston 126, for example, that is spaced from the first end member. A flexible wall 128 extends between the first and second end members and includes opposing open ends 130 and 132. In the exemplary arrangement shown in FIGS. 1 and 2, flexible wall 126 is illustrated as being of an elongated sleeve-type configuration that is capable of forming a rolling lobe 134 along the exterior of an end member, such as piston 126, for example. However, it will be appreciated that other constructions could alternately be used, such as a convoluted bellows-type construction that forms a convoluted-type gas spring, for example.

Flexible wall 126 at least partially defines a spring chamber 136 between the first and second end members and can be secured therebetween in any suitable manner. For example, open end 130 is shown as being connected along bead plate 124 using a crimped arrangement 138 to form a substantially fluid-tight seal between the end member and the flexible wall. As another example, open end 132 is shown as being connected on piston 126 using an end closure 140 that extends across open end 132 and is adapted to form a substantially fluid-tight seal across the open end.

One or more securement devices and/or other components can be used to operatively connect the first and second end members on or along the associated structural components to which the end member are secured. In the example shown in FIG. 2, a threaded bumper mount 142 abuttingly engages end closure 140 and threaded rod 144 extends through lower structural component LSC and piston 126 to threadably engage bumper mount 142. A first threaded nut 146 is disposed along threaded rod 144 and abuttingly engages piston 126 to secure the end closure and flexible wall on the piston. A second threaded nut 148 is shown disposed along the threaded rod and abuttingly engages lower structural component LSC to secure the gas spring assembly on the associated structural component. A bumper 150 is shown supported within spring chamber 136 on bumper mount 142.

As stated above, height control modules 104 are operative to maintain a height of gas spring 122 within a predetermined height range without the utilization of or reliance on external inputs, signals and/or control instructions, such as from other systems and/or devices of the suspension system, for example. Rather, height control modules 104 can operate solely through a connection with a suitable electrical power source on the vehicle, such as battery BAT (FIG. 1) for example.

It will be appreciated that such an electrical connection can be provided in any suitable manner, such as through the use of electrical wires, which are represented in FIGS. 1 and 2 by lines 152. The electrical wires can include any suitable number of electrical conductors or leads. For example, electrical wire 152 is shown in FIG. 2 as including a power conductor 152A in electrical communication with a suitable electrical power source, such as a positive terminal of battery BAT (FIG. 1), for example. Electrical wire 152 is also shown as including a ground conductor 152B in electrical communication with a suitable electrical ground, such as a negative terminal of battery BAT (FIG. 1), for example. Electrical wire 152 can also include an ignition-state conductor 152C in electrical communication with ignition switch IGN. In such case, one or more operational features of height control module 104 or one or more portions of components thereof can be selectively activated or deactivated in relation to the state of the ignition switch.

Optionally, the suspension system can also include one or more operator-actuated devices that may permit an operator to selectively control the operation and/or performance of one or more of the gas spring assemblies. For example, a kneel switch KNL (FIG. 1) can be provided that is accessible by the vehicle operator. If provided, the kneel switch could, for example, be placed in electrical communication with the height control module of one or more of the gas springs by way of a kneel switch conductor 152D in electrical wire 152. It will be appreciated, however, that other arrangements and/or configurations of electrical conductors could alternately be used. Kneel switch KNL can be selectively actuated by the operator to initiate a kneeling action of the suspension system in which pressurized gas is transferred out of one or more of the gas springs, such as, for example, to reduce the height of the vehicle to a level that is better suited for loading or unloading and/or for ease of ingress and egress of passengers.

Height control modules 104 include a height sensor, which is schematically represented in FIG. 2 by reference number 154, a valve arrangement, which is schematically represented in FIG. 2 by item number 156, and a fixed-logic control circuit, which is schematically represented in FIG. 2 by reference number 158, that is operatively connected to the height sensor and valve arrangement.

It will be appreciated that height control modules 104 can be of any suitable construction and/or arrangement and can take the form of any suitable quantity and/or configuration of components. In one example of a suitable embodiment, however, height control modules 104 can include a module housing 160 that is adapted for securement on or along an end member of gas spring 122 (e.g., bead plate 124) in any suitable manner. Module housing 160 can include a housing wall 162 that at least partially defines a housing chamber 164 suitably adapted to at least partially receive and contain height sensor 154, valve arrangement 156 and fixed-logic control circuit 158.

Height sensor 154 is preferably capable of generating or otherwise outputting a signal having a relation to a height or distance associated with gas spring 122, such as a distance between the first and second end member or other spaced components of the vehicle, for example. It will be appreciated that any such height sensor or any other distance-determining devices of any suitable type, kind, construction and/or configuration could be used, such as mechanical linkage sensors, ultrasonic wave sensors or electromagnetic wave sensors, such as may respectively operate using ultrasonic or electromagnetic waves, for example. In the exemplary embodiment shown, height sensor 154 is disposed in fluid communication with spring chamber 136 such that a wave WVE (e.g., an ultrasonic wave or an electromagnetic wave) is transmitted within gas spring 122 toward piston 126.

Valve arrangement 156 is selectively switchable between a first condition in which pressurized gas can be transferred out of spring chamber 136, a second condition in which pressurized gas can be transferred into spring chamber 136 and a third condition in which the spring chamber is fluidically isolated such that pressurized gas is neither transferred into nor out of the spring chamber. It will be appreciated that valve arrangement 156 can take any suitable form, configuration and/or arrangement of fluid control elements. As one example, a valve assembly could be used that includes a single valve body that is selectively switchable between three positions, such as a first outboard position that corresponds to the first condition, an opposing second outboard position that corresponds to the second condition and a center (or neutral) position that corresponds to the third condition. As another example, the valve arrangement could include two (i.e., first and second) separate valves fluidically disposed in parallel relation to one another and selectively switchable between a first or closed position and a second or open position. In such an example, the first valve would correspond to an exhaust valve $V_{EX}$ and could be opened (with the second valve closed) to effect the first condition. The second valve would correspond to an inlet valve $V_{IN}$ and could be opened (with the first valve closed) to effect the second condition. The third condition would correspond to a state in which both the first and second valves are closed. It will be appreciated, however, that the foregoing descriptions are merely exemplary and that any other suitable arrangement could alternately be used.

Fixed-logic control circuit 158 is operatively connected to height sensor 154 as well as valve arrangement 156. The fixed-logic control circuit is adapted to receive electrical power from an associated power source, such as by way of conductors 152A and 152B of electrical wire 152 that are connected to battery BAT (FIG. 1) of vehicle VHC (FIG. 1), for example. Fixed-logic control circuit 158 is also adapted to selectively operate valve arrangement 156 based on input signals received from height sensor 154. It will be appreciated that fixed-logic control circuit 158 of height control module 104 is capable of controlling the height of gas spring 122 without reliance upon other external inputs (e.g., input signals and/or control instructions).

Additionally, it will be recognized that such a direct-logic control circuit in accordance with the subject matter of the present disclosure does not include or use a programmable processor (e.g., a microprocessor or other complete computation engine in the form of an integrated circuit comprising a plurality of transistors) or a programmable memory (e.g., an integrated circuit comprising a plurality of transistors and/or other electronic elements) for storing data, information and/or instructions for use by a programmable processor, such as may be used in conventional arrangements. One advantage of the subject arrangement is that costs associated with the use of processing components (e.g., the programmable processor and memory) that are capable of storing and/or executing programmable code can be avoided. Another advantage is that diagnostic and repair equipment that might otherwise be necessary to maintain conventional gas spring assemblies and/or gas suspension systems that utilize a programmable processor and memory are not required. This may be particularly advantageous under certain circumstances, such as, for example, in geographical areas in which access and/or availability of computer-based diagnostic equipment is limited or where such equipment is simply unavailable.

It will be appreciated that a fixed-logic control circuit in accordance with the subject matter of the present disclosure, such as fixed-logic control circuit 158, for example, can be constructed in any suitable manner and take any suitable form and/or configuration. For purposes of convenience and ease of understanding, the exemplary embodiments of a fixed-logic control circuit are shown and described herein with reference to various sections and/or portions of the control circuit. It will be appreciated, however, that a fixed-logic control circuit in accordance with the present disclosure can take any suitable form, configuration or arrangement, and that the various sections and/or portions of the control circuit shown and described herein may not, in practice, be arranged or otherwise physically grouped in identifiable sections and/or portions. As such, it is to be understood that the reference herein to these various sections and/or portions is not intended to be limiting.

As one example, a fixed-logic control circuit can include an input section and an output section. The input section can be operatively connected with a height sensor and is preferably adapted to receive sensor signals communicated therefrom. Such sensor signals can, for example, correspond to a distance or height between components of an associated gas spring (e.g., gas spring 102). The output section is operatively connected to the input section such that one or more input signals can be communicated therefrom to the output section. Additionally, the output section can be operatively connected with a valve arrangement and is preferably adapted to selectively initiate or otherwise perform the switching or actuation of the valve arrangement between two or more conditions, such as the first, second and third conditions discussed above, for example.

Figure 3:
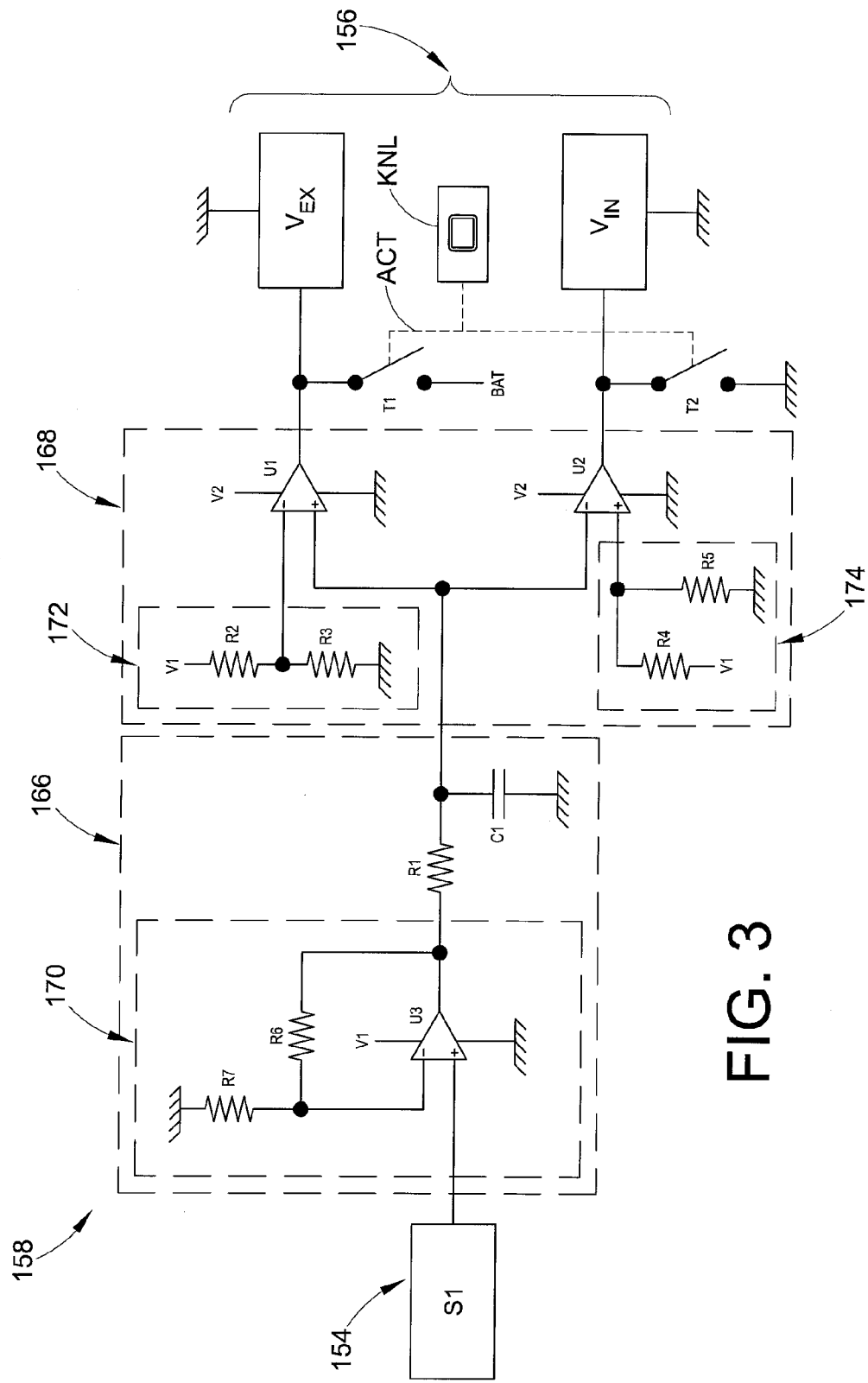
FIG. 3 is a schematic representation of one example of the fixed-logic control circuit shown in use in FIG. 2 with a gas spring.

As one example of a suitable construction, fixed-logic control circuit 158 is shown in FIGS. 2 and 3 as including an input section 166 that is communicatively coupled to height sensor 154 and an output section 168 that is communicatively coupled between input section 166 and a valve arrangement, such as inlet valve $V_{IN}$ and exhaust valve $V_{EX}$ of valve arrangement 156, for example. Input section 166 is shown in FIG. 3 as including resistive and capacitive elements that operate to establish a time constant for receiving a sensor signal from height sensor 154. Input section 166 can also include an optional load-isolation portion 170 that is operative to electrically isolate height sensor 154 from output section 168 as well as the remainder of input section 166. If provided, load-isolation portion 170 of input section 166 can operate to minimize or at least reduce the electrical load placed on height sensor 154 by fixed-logic control circuit 158. The load-isolation portion could also be used to scale the signal from height sensor 154, if desired.

Output section 168 is shown as including a plurality of resistive elements that form a first threshold portion 172, which is operative to establish a first threshold (e.g., voltage level), and a second threshold portion 174, which is operative to establish a second threshold (e.g., voltage level). Output section 168 also includes a plurality of comparators that are operative to compare an input signal (which may also be referred to herein as a reference signal) from input section 166 to the first and second thresholds. As one example, the predetermined first and second thresholds can correspond to voltage levels and the comparators can then be operative to compare the voltage level of the input (or reference) signal to the first and second thresholds. Depending upon the results of the comparison, the comparators can then generate or otherwise output signals suitable for actuating or otherwise switching the valve arrangement between the first, second and third conditions, as have been previously discussed. In this manner, the first and second thresholds establish or otherwise correspond to first, second and third ranges for the input signal from input section 166. In such case, the first range corresponds to the input signal having a voltage level greater than the first threshold. The second range can then correspond to the input signal having a voltage level that is less than the second threshold. The third range would then correspond to the input signal having a voltage level that is less than or equal to the first threshold and greater than or equal to the second threshold.

With more specific reference to the exemplary arrangement in FIG. 3, input section 166 includes a resistor R1 and a capacitor C1 that are connected in series and can operate to establish a time constant. First threshold portion 172 of output section 168 includes resistors R2 and R3 connected in series between a voltage source V1 and ground to form a voltage divider. Similarly, second threshold portion 174 of output section 168 includes resistors R4 and R5 that are connected in series between first voltage source V1 and ground. Output section 168 also includes comparators U1 and U2, which are illustrated as taking the form of operational amplifiers. It will be appreciated, however, that any other suitable fixed-logic or otherwise non-programmable components could alternately be used.

The power supply pins of comparators U1 and U2 are shown as being connected to a second voltage source V2 and ground. The output pins of comparators U1 and U2 are shown as being respectively connected to exhaust valve $V_{EX}$ and inlet valve $V_{IN}$ of valve arrangement 156 with the inlet and exhaust valves being communicatively coupled to ground. The positive input pin of comparator U1 and the negative input pin of comparator U2 are shown as being in communication with input section 166 and receive the input (or reference) signal therefrom. The negative input pin of comparator U1 and the positive input pin of comparator U2 are respectively shown as being in communication with first and second threshold portions 172 and 174. As such, the first and second threshold voltages that the voltage of the input signal is compared against are set by the voltage divider formed by resistors R2 and R3 to set an exhaust voltage threshold and by the voltage divider formed by resistors R4 and R5 to set an inlet voltage threshold.

It will be appreciated that any suitable values can be used for the components shown and described in FIG. 3. The sensor signal from height sensor 154 could vary between 0 and 5 volts with the voltage level increasing as height increases and the voltage level decreasing as height decreases. In such case, a preferred nominal operating height (or design height) could correspond to a voltage level of approximately 2.5 volts for the sensor signal from height sensor 154. A time constant can be formed by the combination of resistor R1 and capacitor C1, as discussed above. One example of a suitable range for such a time constant is from approximately 3 milliseconds to approximately 50 milliseconds. In one preferred arrangement, a time constant of approximately 10 milliseconds can be achieved through the use of values of 10K ohms for resistor R1 and one microfarad for capacitor C1. One benefit of utilizing a short time constant is that overshooting of the target height of the gas spring assembly can be minimized or avoided.

Using the example of a target reference voltage of 2.5 volts for the nominal operating height of the gas spring assembly, a range of plus/minus 0.5 volts can be used to establish the first and second threshold values. It will be appreciated, however, that an asymmetric range could alternately be used for the first and second threshold values with respect to the target reference voltage. Further to the present example, first threshold portion 172 can establish a threshold voltage of approximately 3 volts through the use of values of 20K ohms and 30K ohms for resistors R2 and R3, respectively. In such case, exhaust valve $V_{EX}$ is energized or otherwise opened to lower the gas spring assembly when the voltage of the sensor signal from height sensor 154 exceeds 3 volts. Second threshold portion 174 can establish a threshold voltage of approximately 2 volts through the use of values of 30K ohms and 20K ohms for resistors R4 and R5, respectively. In such case, inlet valve $V_{IN}$ is energized or otherwise opened to raise the gas spring assembly when the voltage of the sensor signal from height sensor 154 drops below approximately 2 volts.

Load-isolation portion 170 of input section 166, if provided, can operate as a voltage follower that isolates height sensor 154 from the remainder of control circuit 158. Load-isolation portion 170 is shown in FIG. 3 as including a plurality of resistive elements and a comparator that is operatively connected between height sensor 154 and resistor R1 of the input section. The power supply pins of comparator U3 are shown as being connected to first voltage source V1 and ground. The output pin of comparator U3 is connected to resistor R1. The positive input pin of comparator U3 is connected to height sensor 154 and the negative input pin is connected to ground in series with a resistor R7. Additionally, a resistor R6 is communicatively coupled between the negative input pin and the output pin of comparator U3. The values of resistors R6 and R7 can be selected to scale the sensor signal to any desired range.

Additionally, in this example, first voltage source V1 can be selected to be approximately 5 volts, as many commercially-available sensors operate over a range of 0-5 volts. Second voltage source V2 can be selected to be approximately 12 volts, as this is a common voltage utilized to operate solenoid valves and other valve actuation devices. It will be recognized, however, that other voltages and/or voltage ranges could alternately be used.

If one or more optional operator-activated input devices are provided, such devices can be communicatively coupled to fixed-logic control circuit 158 in any suitable manner. For example, if operator-activated kneel switch KNL is provided, the kneel switch can be communicatively coupled with at least exhaust valve $V_{EX}$ to energize or otherwise selectively actuate the exhaust valve and thereby permit pressurized gas transfer out of the gas spring assembly. In the exemplary arrangement shown in FIG. 3, a first throw T1 of kneel switch KNL places battery BAT in electrical communication with exhaust valve $V_{EX}$ such that the exhaust valve is energized or otherwise actuated as the kneel switch is depressed or otherwise operated. In the exemplary arrangement shown in FIG. 3, exhaust valve $V_{EX}$ is placed in electrical communication with battery BAT by first throw T1 of kneel switch KNL independent of the state of ignition switch IGN. As such, a kneeling action of the suspension system can be performed when the vehicle is not in active operation (i.e., when the ignition switch is in an Off position).

Optionally, kneel switch KNL can include a second throw T2 in electrical communication between the output pin of comparator U2 and ground. Such an arrangement can operate to prevent inlet valve $V_{IN}$ from being energized or otherwise actuated during a kneel operation. In a preferred arrangement, throws T1 and T2 will be made by a single action or input from an operator using kneel switch KNL, as is represented in FIG. 3 by dashed line ACT. It will be appreciated, however, that other arrangements could alternately be used.

Figure 4:
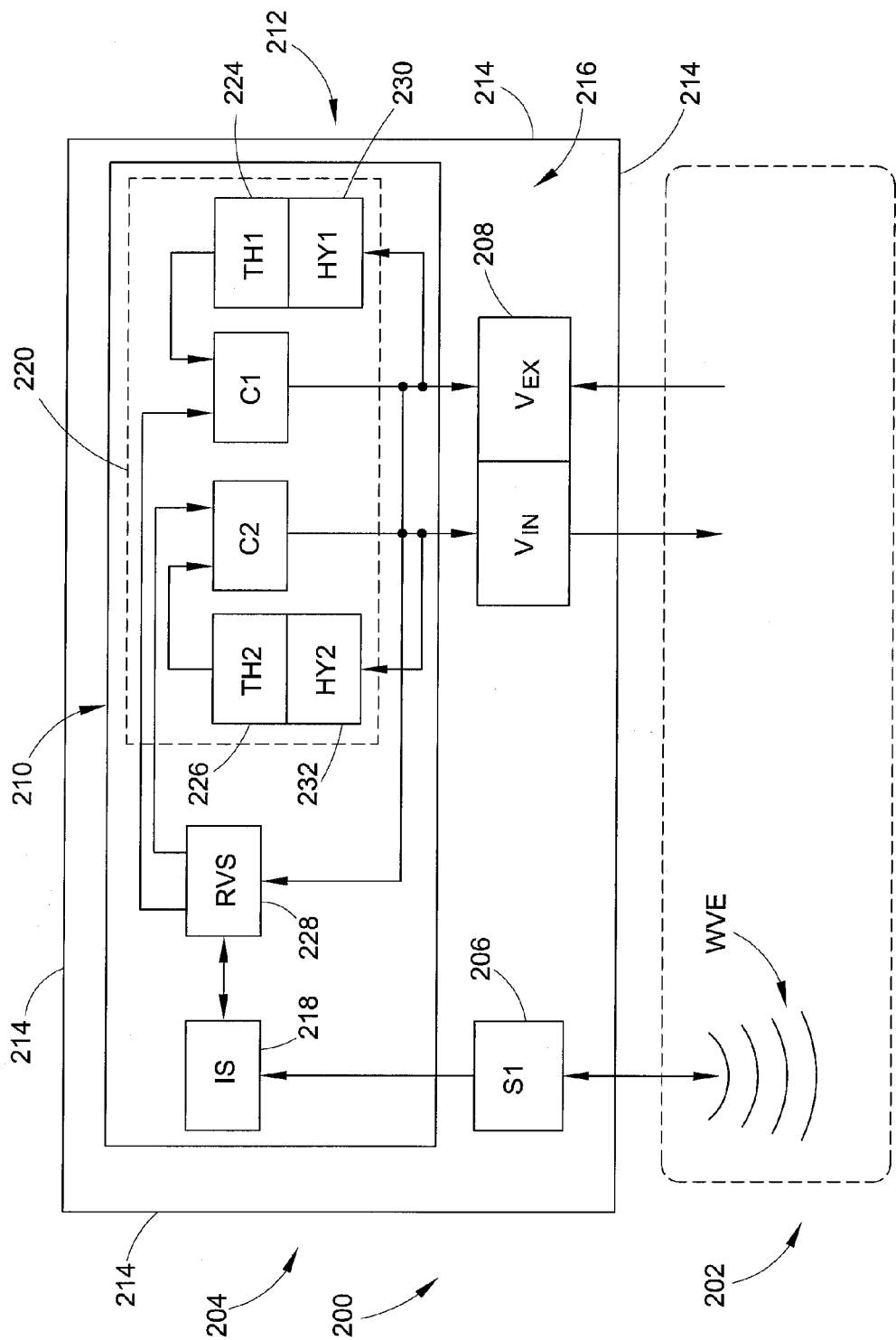
FIG. 4 is a schematic representation of another example of a gas spring assembly in accordance with the subject matter of the present disclosure.

FIG. 4 illustrates another example of a gas spring assembly 200 in accordance with the subject matter of the present disclosure. Gas spring assembly 200 includes a gas spring, which is schematically represented in FIG. 4 and identified by item number 202, and a height control module, which is schematically represented in FIG. 4 and identified by item number 204. Gas spring 202 can be of any suitable type, kind, configuration and/or construction, such as has been described in connection with gas spring 122 in FIG. 2, for example. Height control module 204 is operatively associated with gas spring 202 to form gas spring assembly 200, such as has been described above in connection with height control module 104 of gas spring assembly 102, for example. As such, the operative relationship between gas spring 202 and height control module 204 to form and operate as gas spring assembly 200 are not repeated here.

Height control module 204 is shown in FIG. 4 as including a height sensor, which is schematically represented in FIG. 4 by item number 206, a valve arrangement, which is schematically represented in FIG. 4 by item number 208, and a fixed-logic control circuit, which is schematically represented in FIG. 4 by item number 210, that is operatively connected to the height sensor and the valve arrangement. It will be appreciated that height sensor 206 can be of any suitable type, kind, configuration and/or construction, such as has been described above with regard to height sensor 154, for example, and that valve arrangement 208 can be of any suitable type, kind, configuration and/or construction, such as has been described above with regard to valve arrangement 156, for example. As such, height sensor 206 and valve arrangement 208 can operate in substantially the same manner discussed above. Accordingly, details of the structure and/or operation of height sensor 206 and valve arrangement 208 are not presented here in further detail.

As discussed above with regard to height control module 104, it will be appreciated that height control modules 204 can be of any suitable construction and/or arrangement and can take the form of any suitable quantity and/or configuration of components. As one example, height control modules 204 can include a module housing 212 that is adapted for securement on or along an end member of gas spring 202 (e.g., bead plate 124 of gas spring 122) in any suitable manner. Module housing 212 can include at least one housing wall 214 that at least partially defines a housing chamber 216 suitable for at least partially housing height sensor 206, valve arrangement 208 and fixed-logic control circuit 210.

Fixed-logic control circuit 210 is operatively connected to height sensor 206 as well as valve arrangement 208, such as has been discussed above with regard to height sensor 154, valve arrangement 156 and fixed-logic control circuit 158, for example. As such, fixed-logic control circuit 210 is adapted to receive electrical power from an associated power source, such as by way of power conductor 152A (FIG. 2) and ground conductor 152B (FIG. 2) of electrical wire 152 (FIG. 1), such as may be connected to battery BAT (FIG. 1) of vehicle VHC (FIG. 1), for example. Fixed-logic control circuit 210 is adapted to selectively operate valve arrangement 208 based on sensor signals received from height sensor 206. It will be appreciated that fixed-logic control circuit 210 of height control module 204 is capable of controlling the height of gas spring 202 without reliance upon other external inputs (e.g., input signals and/or control instructions), as has been discussed above with regard to height control module 104.

Figure 5:
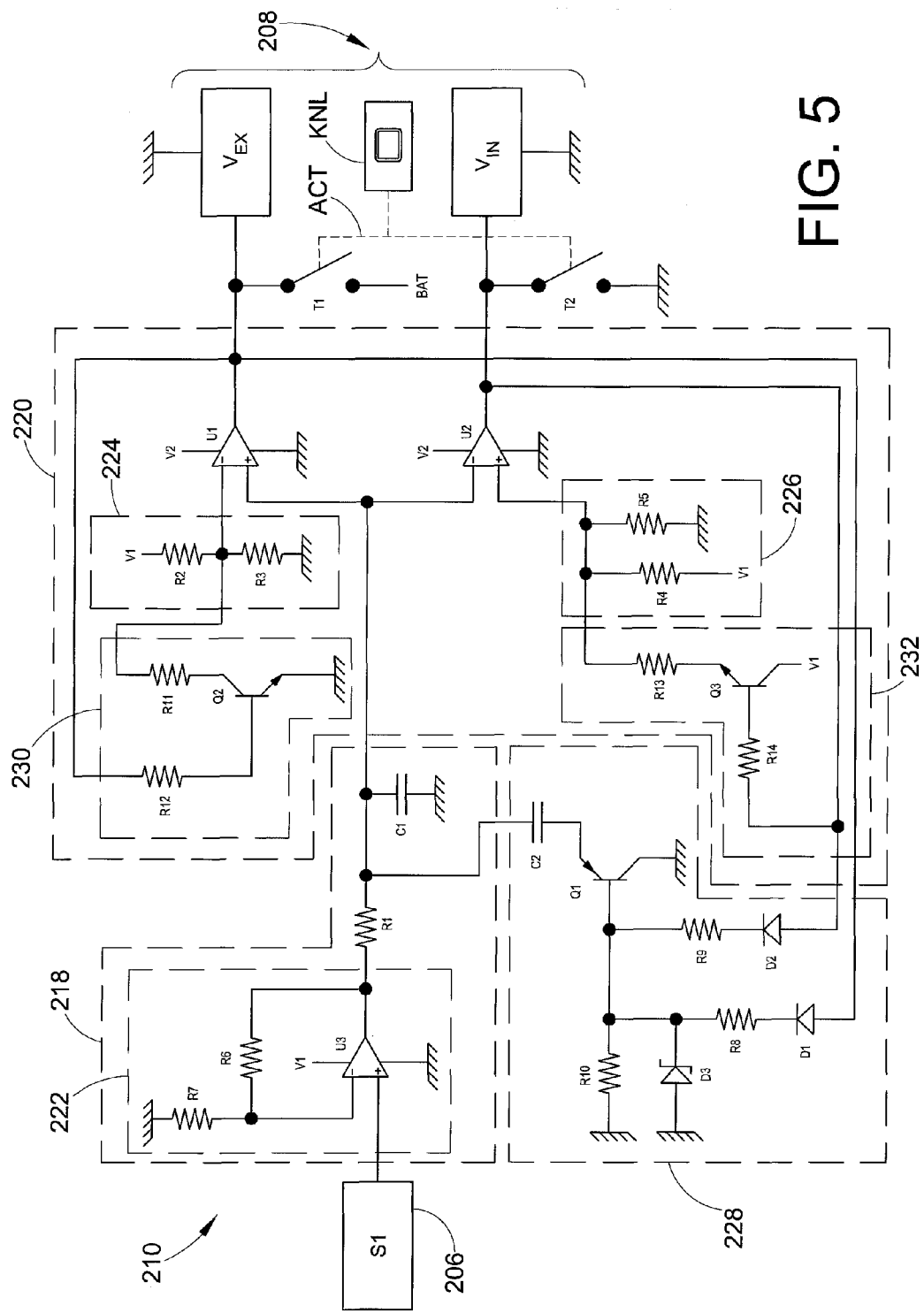
FIG. 5 is a schematic representation of one example of the fixed-logic control circuit shown in use in FIG. 4 with a gas spring.

Fixed-logic control circuit 210 is shown in FIGS. 4 and 5 as including an input section 218 that is communicatively coupled to height sensor 206 and output section 220 that is communicatively coupled between input section 218 and a valve arrangement, such as inlet valve $V_{IN}$ and exhaust valve $V_{EX}$ of valve arrangement 208, for example. Input section 218 includes resistive and capacitive elements that operate to establish a time constant for receiving a sensor signal from height sensor 206. Input section 218 is also shown as including an optional load-isolation portion 222 that is operative to otherwise electrically isolate height sensor 206 from output section 220 and other sections of fixed-logic control circuit 210. Input section 218 is shown in FIGS. 4 and 5 as being substantially similar in operation and configuration to input section 166, which has been described above with respect to FIGS. 2 and 3. Additionally, like components numbers (e.g., R1, C1, V1) for electronic components of input section 218 have been maintained with those previously described in connection with input section 166.

Additionally, fixed-logic control circuit 210 can be communicatively coupled to one or more operator-actuated input device that can be optionally included, such as kneel switch KNL, for example. The operative interconnection between inlet valve $V_{IN}$ and exhaust valve $V_{EX}$ of valve assembly 208 is shown in FIG. 5 as being substantially similar in operation and configuration to the arrangement described above in connection with valve arrangement 156 in FIG. 3. Like components (e.g., T1, T2) for electronic components have been maintained with those previously described and the overall function and operation of these components is not repeated here.

Output section 220 is shown in FIGS. 4 and 5 as including a plurality of resistive elements that form a first threshold portion 224, which is operative to establish a first threshold (e.g., voltage level), and a second threshold portion 226, which is operative to establish a second threshold (e.g., voltage level). Output section 220 also includes a plurality of comparators that are operative to compare an input signal (or reference signal) from input section 218 to the first and second thresholds. It will be appreciated that first and second threshold portions 224 and 226 of output section 220 are substantially similar in operation to first and second threshold portions 172 and 174 of output section 168, as has been described above. Additionally, it will be appreciated that the structure and operation of comparators U1 and U2 in output section 220 are substantially similar to the comparators described in connection with output section 168. Furthermore, like components numbers (e.g., R2-R5, U1 and U2) for electronic components of output section 220 have been maintained with those previously described in connection with output section 168.

Fixed-logic control circuit 210 differs from control circuit 158 in that fixed-logic control circuit 210 includes an optional response-rate variation section 228 that is adapted to operate fixed-logic control circuit 210 at one of two response rates depending upon a state of the gas spring assembly. As one example, response-rate variation section 228, if provided, could act to permit operation of output section 220 at a first rate when valve arrangement 208 is in either of the first or second conditions (i.e., when pressurized gas is being transferred into or out of the gas spring) and permit operation of output section 220 as a second rate when valve arrangement 208 is in the third condition (i.e., when the gas spring is isolated so that no substantial gas transfer is occurring). In a preferred arrangement, the first rate is substantially greater than the second rate. One benefit of such an operational configuration is that increased performance can be obtained during operation at the first rate such that height changes are performed quickly and accurately. Operation at the second rate minimizes the occurrence of height adjustments during transient height deviations, such as may be due to acceleration, braking, turning and/or road inputs, for example.

Response-rate variation section 228 is communicatively coupled with input section 218 such that the time constant defined together with the combination of resistor R1 and capacitor C1 can be varied between the first and second response rates. Response-rate variation section 228 includes a capacitor C2 that is connected in series with resistor R1 and in parallel with capacitor C1 of input section 218. A transistor Q1 is connected in series between capacitor C2 and ground. A resistor R8 and diode D1 are connected in series between the base of transistor Q1 and the output pin of comparator U1. Additionally, a resistor R9 and a diode D2 are connected in series between the base of transistor Q1 and the output pin of comparator U2. A resistor R10 is connected in series between the base of transistor Q1 and ground, and an optional diode D3 is also connected in series between the base of transistor Q1 and ground.

Transistor Q1 that is configured to act as a switch. Transistor Q1 is in a conductive state when the gate thereof is low and is in a non-conductive state when the gate thereof is high. Thus, whenever either inlet valve $V_{IN}$ or exhaust valve $V_{EX}$ is energized by a respective one of comparator U2 or U1, transistor Q1 will switch off removing the contribution of capacitor C2 to the time constant. When neither inlet valve $V_{IN}$ nor exhaust valve $V_{EX}$ is energized, the gate of transistor Q1 will go to ground and switch transistor Q1 into a conductive state to thereby add the contribution of capacitor C2 to the time constant.

With more specific reference to the electrical components described above, capacitor C2 could have a value of 2200 microfarads while maintaining the values of resistor R1 and capacitor C1 as described above in connection with the earlier example. In such an example, when transistor Q1 is switched ON, the time constant will have a value of approximately 22 seconds. It will be appreciated, however, that any suitable value could alternately be used, such as a valve within a range of approximately 10 seconds to approximately 60 seconds, for example. When transistor Q1 is switched off, the time constant will have a value of approximately 10 milliseconds. In this manner, a rapid response rate is achieved when either inlet valve $V_{IN}$ or exhaust valve $V_{EX}$ is energized.

The values of resistors R8, R9 and R10 as well as the threshold value for optional diode D3 are not critical as long as appropriate values are selected to keep transistor Q1 in a saturated mode of operation. The parameters for diodes D1 and D2 are also not critical and are selected to block any voltage from the gate of transistor Q1 from being communicated back to the output of comparators U1 and U2 when the same are low. The purpose of this circuitry is to logically NOR the outputs of comparators U1 and U2 so that capacitor C2 is switched out of the circuit when either the exhaust or inlet valve is energized and switched into the circuit when neither the exhaust nor inlet valve is energized.

As discussed above, the function of response-rate variation section 228 modifies the behavior of fixed-logic control circuit 210 such that the control circuit will react slowly to changes in the sensor signal from height sensor 206 when neither inlet valve $V_{IN}$ nor exhaust valve $V_{EX}$ are energized. However, fixed-logic control circuit 210 can react quickly to changes in the sensor signal from the height sensor when either inlet valve $V_{IN}$ or exhaust valve $V_{EX}$ is energized. It is anticipated that this operational capability will significantly improve performance compared to conventional mechanical leveling valves as well as in comparison to control circuit 158. As a result, short term deviations from the set height of the gas spring, such as may be due to acceleration, braking, turning and road imperfections, for example, will not result in an adjustment to the height of the vehicle via the gas springs. However when the height of the vehicle is being adjusted, the adjustment will be stopped quickly when the height is brought back in the range established by the first and second threshold levels. It is to be appreciated that this functionality can be implemented by other means such as by limiting the outputs of the valves to five volts and then feeding the outputs into a logic NOR gate. Such an arrangement could then be used to drive an appropriate MOSFET transistor or other component to switch capacitor C2 in and out of the circuit.

Fixed-logic control circuit 210 also differs from control circuit 158 in that output section 220 of fixed-logic control circuit 210 also includes optional hysteresis portions that are operative to adjust the first and second thresholds established by first and second threshold portions 224 and 226. In the exemplary arrangement shown in FIGS. 4 and 5, a first hysteresis portion 230 is communicatively coupled to first threshold portion 224 and a second hysteresis portion 232 is communicatively coupled to second threshold portion 226. As a result, a hysteresis is added to each of the first and second thresholds which can operate to reduce the activity of at least output section 220 of fixed-logic control circuit 210 under certain conditions of operation. For example, under conditions in which a height of a gas spring is near the first or second threshold, frequent height adjustment actions may occur due to small movements of the gas spring, such as those associated with the dynamic operation of the vehicle. Such frequent adjustment actions may be avoided through the inclusion of hysteresis portions 224 and 226, which would be expected to result in lower consumption of pressurized gas and improved overall performance.

First hysteresis portion 230 is shown as including a resistor R11 and a transistor Q2 connected in series between first threshold portion 224 and ground. Additionally, a resistor R12 is connected between the base of transistor Q2 and the output pin of comparator U1. Second hysteresis portion 232 is shown as including a resistor R13 and a transistor Q3 connected in series between second threshold portion 226 and first voltage source V1. A resistor R14 is also connected between the base of transistor Q3 and the output pin of comparator U2.

In use, as exhaust valve $V_{EX}$ is energized, transistor Q2 is switched on placing a resistor R11 in parallel with a resistor R3, which thereby lowers the voltage of the first threshold that is communicated to comparator U1. As inlet valve $V_{IN}$ is energized, transistor Q3 is switched on which places resistor R13 in parallel with resistor R4. This, in turn, raises the voltage of the second threshold that is communicated to comparator U2.

With further reference to the above-described example, the value of resistor R2 can be changed to 90K ohms in order to maintain a level of 3 volts for the first threshold, which is communicated to comparator U1. Additionally, the value of resistor R4 can be changed to 100K ohms in order to maintain a level of 2 volts for the second threshold, which is communicated to comparator U2. Further to this example, a value of 250K ohms can be used for resistor R11 and a value of 650K ohms can be used for resistor R13. In such an arrangement, the hysteresis will vary the first threshold from 3 volts to 2.75 volts when the exhaust valve is energized. Additionally, the hysteresis will vary the second threshold from 2 volts to 2.25 volts when the inlet valve is energized.

As the height of the gas spring increases during use to the point at which the sensor signal from height sensor 206 is greater than approximately 3 volts, exhaust valve $V_{EX}$ will open. The exhaust valve will remain open until the gas spring is lowered sufficiently that the sensor signal from the height sensor is below approximately 2.75 volts. Similarly, as the height of the gas spring decreases to the point at which the sensor signal from the height sensor is less than approximately 2 volts, inlet valve $V_{IN}$ will open. The inlet valve will remain open until the height of the gas spring is raised sufficiently for the signal from the height sensor to be greater than approximately 2.25 volts. As mentioned above, this hysteresis is expected to reduce activity of the fixed-logic control circuit such that the height of the gas spring does not remain at or near the first or second thresholds, which could result in frequent adjustments of small magnitude.

In this example, the input to the voltage divider can optionally be changed from first voltage source V1 to second voltage source V2. Such a change can to provide compatibility with the voltage that is applied to the gates of transistors Q2 and Q3. Other voltage can be used but care should be exercised to keep the gate voltages of transistors Q2 and Q3 at appropriate values.

Figure 6:
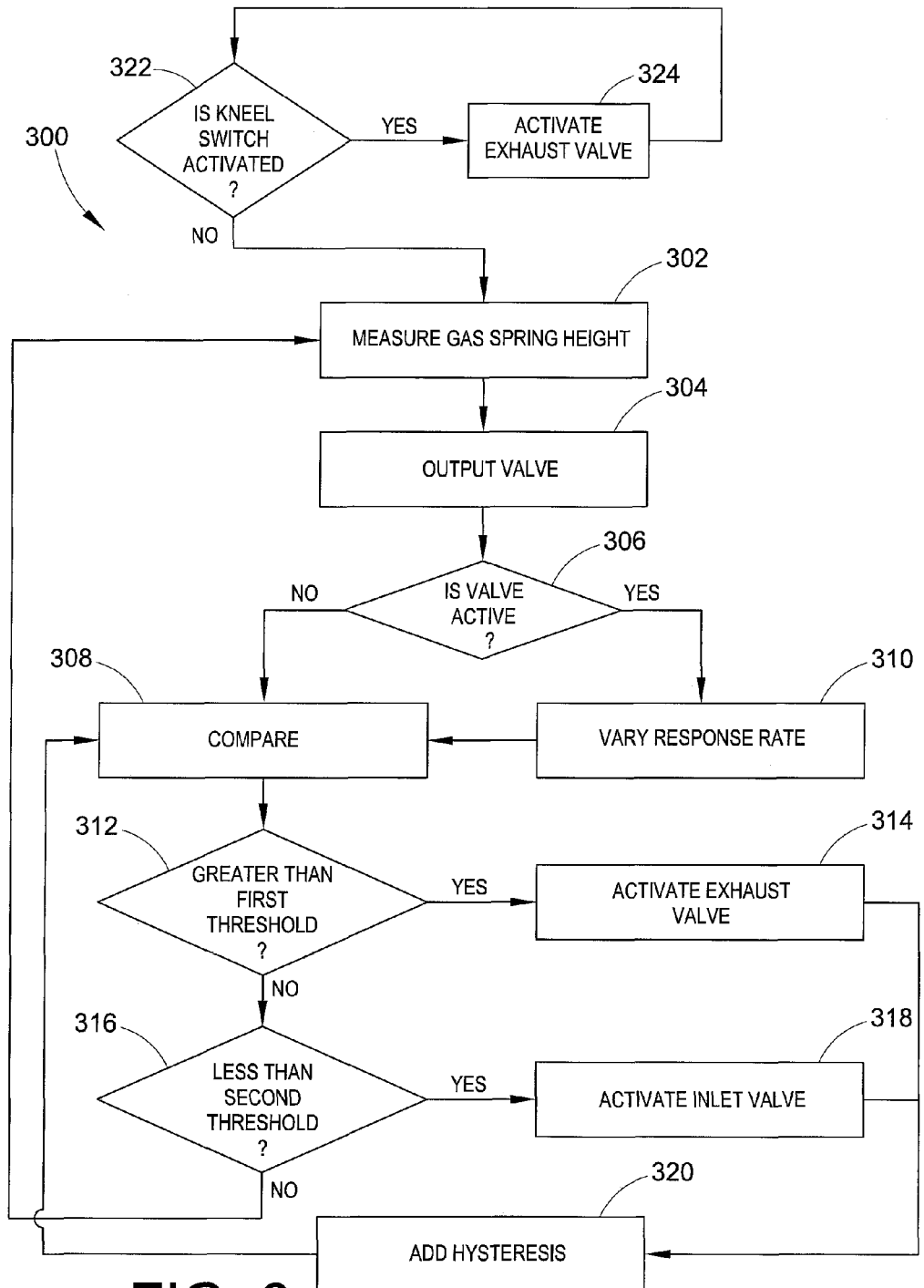
FIG. 6 is a graphical representation of one method of controlling a height of a gas spring assembly in accordance with the subject matter of the present disclosure.

FIG. 6 illustrates one example of a method 300 of selectively activating an exhaust valve or an inlet valve of a gas spring assembly, such as gas spring assemblies 102 and 200, for example, to maintain the height of the gas spring within a predetermined height range. At reference number 302, the height of a gas spring is measured, such as by using a suitable height sensor, for example, and a sensor signal having a voltage or current level that corresponds to the height is output as a reference signal, as indicated by reference number 304. In a preferred arrangement, the reference signal is representative of a particular dimension, such as inches or millimeters of distance within the gas spring, for example. At reference number 306, a determination is made as to whether an inlet valve or an exhaust value is actuated or otherwise open. If a NO determination is made at reference number 306, method 300 proceeds to reference number 308 at which a comparison in made between the reference signal and a first or second threshold level. If a YES determination is made at reference number 306, method 300 proceeds to reference number 310 at which the response rate of the control circuit is varied before the comparison at reference number 308 is performed. Thereafter, the comparison at reference number 308 is performed.

At reference number 312, a determination is made as to whether the reference signal is greater than the first threshold voltage. If a YES determination is made, the exhaust valve is activated as indicated by reference number 314. If a NO determination is made, a further determination is made at reference number 316 as to whether the reference signal is less than the second threshold voltage. If a YES determination is reached at reference number 316, the inlet valve is activated, as indicated by reference number 318. If a NO determination is reached, method 300 returns to reference number 302 to continue to measure the height of the gas spring assembly. Method 300 can also, optionally, include an action of adding a hysteresis, as indicated by reference number 320, such as, for example, to assist with the prevention of undesired activity of the circuit when the threshold is reached or is close thereto. Once the hysteresis has been added at reference number 320, the reference can again be compared to the first and second thresholds at reference number 308 to determine if any further action will be taken.

As discussed above, some configurations of a suspension system in accordance with the subject matter of the present disclosure may optionally include one or more operator-actuated input devices, such as kneel switch KNL, for example. In such case, a method in accordance with the subject matter of the present disclosure can optionally include one or more steps and/or actions in connection with such one or more operator-actuated input devices. For example, method 300 can optionally include an inquiry as to whether kneel switch KNL has been activated, as indicated by reference number 322 in FIG. 6. If the kneel switch is no activated, a NO determination is reached at reference number 322 and method 300 proceeds with selectively activating an exhaust valve or an inlet valve, as described above in connection with reference number 302. If a YES determination is reached at reference number 322, the exhaust valve is activated to perform a kneel operation, as indicated by reference number 324, and method 300 returns to the inquiry at reference number 322. Upon deactivation of kneel switch KNL, a NO determination will be reached at reference number 322 and method 300 will proceed to reference number 302, such as has been discussed above.

In an alternate arrangement, a pressurized gas source, such as compressor 108, for example, could operate as (and, thus, in place of) the inlet valve (e.g., inlet valve $V_{IN}$ of valve assembly 156 and/or 208) of a height control system in accordance with the subject matter of the present disclosure. In such an arrangement, a fixed-logic control circuit, such as control circuit 158 and/or 210, for example, could selectively control the operation of the pressurized gas source to selectively transfer pressurized gas into the spring chamber of one or more gas springs, such as has been described above, for example.

Additionally, or as a further alternative, the exhaust valve (e.g., exhaust valve $V_{EX}$ of valve assembly 156 and/or 208) of a height control system in accordance with the subject matter of the present disclosure could take the form of a separate exhaust valve (not shown), such as by being provided in operative association with the pressurized gas source, for example. In this further arrangement, a fixed-logic control circuit, such as control circuit 158 and/or 210, for example, could selectively control the operation of the separate exhaust valve to selectively transfer pressurized gas out of the spring chamber of one or more gas springs, such as has been described above, for example.

In either or both of these alternative arrangement, it will be appreciated that two or more spring chambers may be placed in common fluid communication with the pressurized gas source (acting as an inlet valve) and/or a separately provided exhaust valve. As such, pressurized gas may be transferred into and/or out of these two or more spring chambers in a common manner. It will also be appreciated that any suitable electrical components, such as a relay (not shown), for example, could be used to permit the fixed-logic circuit to perform one or more of the aforementioned alternative operations.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the term "gas" is used herein to broadly refer to any gaseous or vaporous fluid. Most commonly, air is used as the working medium of gas suspension systems and the components thereof, such as those described herein. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring assembly comprising:

a first end member including a wall and a passage extending therethrough;

a second end member disposed in spaced relation to said first end member;

a flexible wall secured on said first and second end members such that a spring chamber is at least partially defined therebetween; and, a height control system supported on said wall of said first end member, said height control system including:

a sensor operative to generate a signal having a relation to a distance between said first and second end members;

a valve arrangement in fluid communication with said spring chamber through said passage in said wall of said first end member, said valve arrangement selectively operable between a first condition that permits one of gas transfer into said spring chamber and gas transfer out of said spring chamber, a second condition that permits the other of gas transfer into said spring chamber and gas transfer out of said spring chamber, and a third condition in which said spring chamber is fluidically isolated; and, a fixed-logic control circuit capable of operating at a first response rate when said valve arrangement is in one of said first and second conditions and capable of operating at a second response rate when said valve arrangement is in said third condition with said first response rate being substantially greater than said second response rate;

said circuit including an input section and an output section, said input section adapted to receive said signal from said sensor and convert said signal to a reference voltage, said output section operative to compare said reference voltage to a first threshold voltage and a second threshold voltage, said output section adapted to initiate switching of said valve arrangement to said first condition if said reference voltage is greater than said first threshold voltage, and said output section adapted to initiate switching of said valve arrangement to said second condition if said reference voltage is less than said second threshold voltage.

2. A gas spring assembly according to claim 1, wherein said fixed-logic control circuit includes a response rate-variation section operative to selectively vary said response rate for switching of said condition of said valve arrangement.

3. A gas spring assembly according to claim 2, wherein said response rate-variation section is adapted to one of:
a) delay conversion of said signal to said reference voltage if said valve arrangement is in either said first or second condition; and,
b) delay comparison of said reference voltage to said first and second threshold voltages if said valve arrangement is in either said first or second condition.

4. A gas spring assembly according to claim 3, wherein said response rate-variation section includes a first capacitive element, a second capacitive element electrically connected in parallel with said first capacitive element, and a first resistive element electrically connected in series with said first and second capacitive elements.

5. A gas spring assembly according to claim 4, wherein said response rate-variation section includes a transistor electrically connected in series with said first capacitive element, said transistor biased when said valve arrangement is in one of said first and second conditions and thereby causing said first capacitive element to electrically connect to ground in parallel with said second capacitive element.

6. A gas spring assembly according to claim 1, wherein said input section of said fixed logic control circuit includes a comparative element in electrical communication between said sensor and said output section thereby electrically isolating said sensor from at least said output section of said fixed-logic control circuit.

7. A gas spring assembly according to claim 1, wherein said output section of said fixed-logic control circuit is disposed in electrical communication between said input section and said valve arrangement and said output section includes a first output connection for initiating actuation of said valve arrangement into said first condition, a second output connection for initiating actuation of said valve arrangement into said second condition, a first comparator in electrical communication between said input section and said first output connection and operative to output a valve actuation signal along said first output connection when said reference voltage is greater than said first threshold voltage, and a second comparator in electrical communication between said input section and said second output connection and operative to output a valve actuation signal along said second output connection when said reference voltage is less than said second threshold voltage.

8. A gas spring assembly according to claim 7, wherein said output section of said fixed-logic control circuit includes a hysteresis operative to reduce actuation of said valve arrangement as said reference voltage approaches one of said first and second threshold voltages.

9. A gas spring assembly according to claim 8, wherein said output section of said fixed-logic control circuit includes a first transistor communicatively coupled to said first comparator for providing said hysteresis with respect to said first threshold voltage and a second transistor communicatively coupled to said second comparator for providing said hysteresis with respect to said second threshold voltage.

10. A gas spring assembly according to claim 1, wherein said first response rate is within a range of from approximately 3 milliseconds to approximately 50 milliseconds and said second response rate is within a range of from approximately 10 seconds to approximately 60 seconds.

11. A gas spring assembly according to claim 1, wherein said valve arrangement includes a first valve and a second valve with said first and second valves being actuatable between a first position in which fluid flow therethrough is permitted and a second position in which fluid flow therethrough is substantially inhibited.

12. A gas spring assembly according to claim 11, wherein said first condition corresponds to a combination of said first valve actuated into said first position and said second valve actuated into said second position, said second condition corresponds to a combination of said first valve actuated into said second position and said second valve actuated into said first position, and said third condition corresponds to a combination of said first and second valves actuated into said second position.

13. A gas spring assembly according to claim 1 further comprising a housing supported on said first end member and including a housing wall at least partially defining a housing chamber, said height control system operatively disposed on said housing such that at least a portion of said sensor, said valve arrangement and said fixed-logic control circuit are disposed within said housing chamber.

14. A gas spring assembly according to claim 13, wherein said housing wall includes an opening disposed in fluid communication with said valve arrangement, said housing positioned on said first end member such that said opening in said housing wall is in fluid communication with said passage in said first end member thereby placing said valve arrangement in fluid communication with said spring chamber.

15. A suspension system for an associated vehicle having an associated unsprung mass and an associated sprung mass, said suspension system comprising:
a gas spring assembly according to claim 1, said gas spring assembly operatively connected between the associated unsprung mass and the associated sprung mass of the associated vehicle;
a pressurized gas source in fluid communication with said valve arrangement of said gas spring assembly and operative to supply pressurized gas to said gas spring assembly; and,
an electrical power source in electrical communication with at least said fixed-logic control circuit.

16. A suspension system according to claim 15, wherein said pressurized gas source includes a compressor and a controller in electrical communication with said electrical power source, said controller operative to selectively operate said compressor to provide said pressurized gas to said gas spring assembly.

17. A suspension system according to claim 15 further comprising an operator-actuatable input device in electrical communication with at least said fixed-logic control circuit of said gas spring assembly.

18. A suspension system according to claim 17, wherein said operator-actuatable input device is a kneel switch that is communicatively coupled between said electrical power source and said valve arrangement.

19. A height control module adapted for securement on an associated end member of an associated gas spring assembly, said height control module comprising:
a housing adapted for securement on the associated end member of the associated gas spring assembly, said housing including a housing wall at least partially defining a housing chamber;

a sensor at least partially disposed within said housing chamber and operative to generate a signal having a relation to a height of the associated gas spring assembly;

a valve arrangement at least partially disposed within said housing chamber, said valve arrangement selectively operable between a first condition capable of permitting one of gas transfer into the associated gas spring assembly and gas transfer out of the associated gas spring assembly, a second condition capable of permitting the other of gas transfer into the associated gas spring assembly and gas transfer out of the associated gas spring assembly, and a third condition capable of fluidically isolating the associated gas spring assembly; and, a fixed-logic control circuit at least partially disposed within said housing chamber, said fixed-logic control circuit capable of reacting at a first response rate when said valve arrangement is in one of said first and second conditions and capable of reacting at a second response rate when said valve arrangement is in said third condition with said first response rate being substantially greater than said second response rate;

said circuit including an input section and an output section, said input section adapted to receive said signal from said sensor and convert said signal to a reference voltage, said output section operative to compare said reference voltage to a first threshold voltage and a second threshold voltage, said output section adapted to initiate switching of said valve arrangement to said first condition if said reference voltage is greater than said first threshold voltage, and said output section adapted to initiate switching of said valve arrangement to said second condition if said reference voltage is less than said second threshold voltage.

20. A height control module according to claim 19, wherein said fixed-logic control circuit includes a response rate-variation section operative to selectively vary said response rate for switching of said condition of said valve arrangement.

21. A height control module according to claim 19, wherein said input section of said fixed logic control circuit includes a comparative element in electrical communication between said sensor and said output section thereby electrically isolating said sensor from at least said output section of said fixed-logic control circuit.

22. A height control module according to claim 19, wherein said output section of said fixed-logic control circuit is disposed in electrical communication between said input section and said valve arrangement, said output section includes a first output connection in electrical communication with said valve arrangement, a second output connection in electrical communication with said valve arrangement, a first comparator in electrical communication between said input section and said first output connection and operative to output a valve actuation signal along said first output connection when said reference voltage is greater than said first threshold voltage, and a second comparator in electrical communication between said input section and said second output connection and operative to output a valve actuation signal along said second output connection when said reference voltage is less than said second threshold voltage.

* * * * *